Oct. 25, 1938.  V. J. HILL, JR., ET AL  2,134,653
AIRPLANE FLOTATION DEVICE
Filed June 4, 1935   2 Sheets-Sheet 2
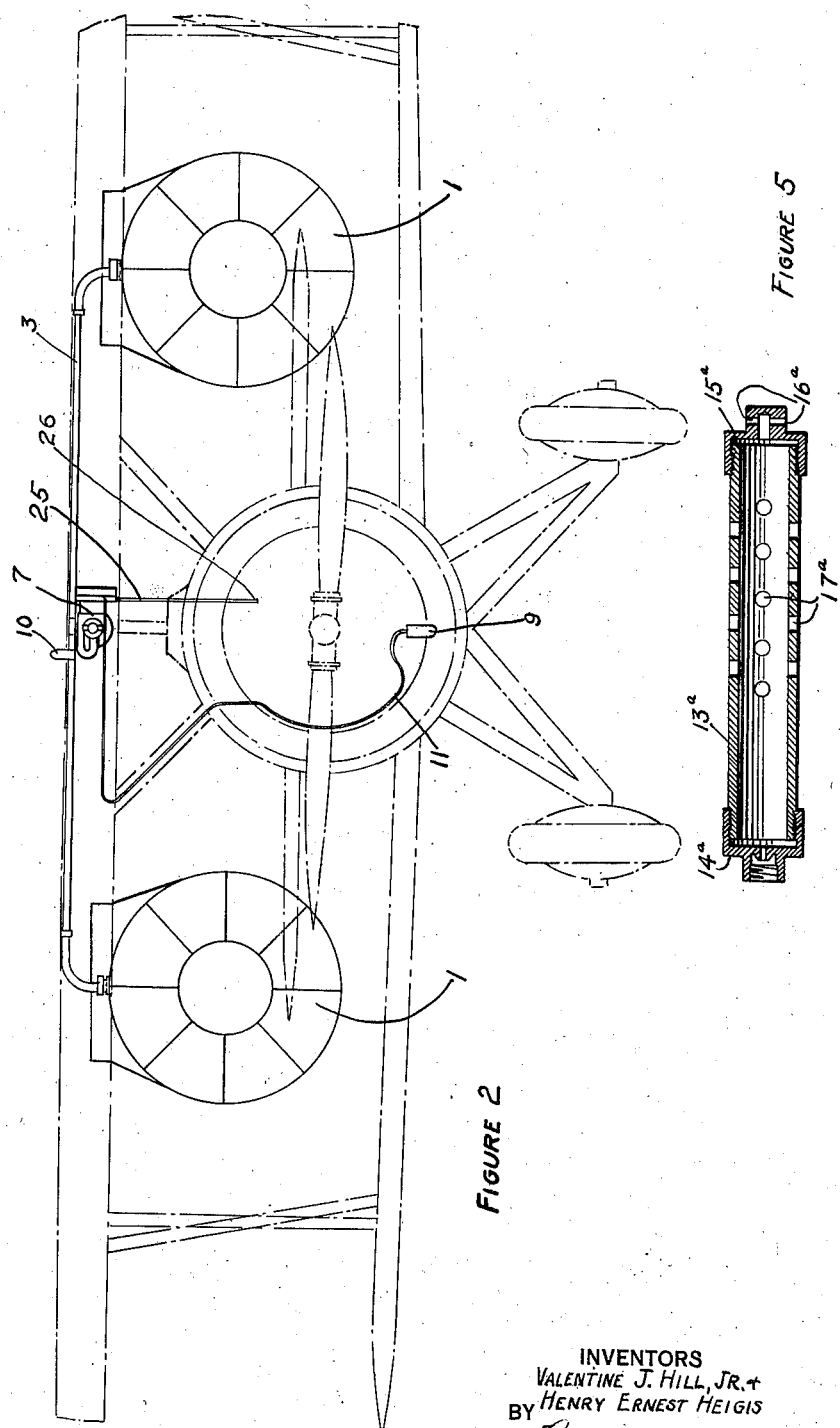
INVENTORS
VALENTINE J. HILL, JR. +
BY HENRY ERNEST HEIGIS
Paul G. Anderson
ATTORNEY Patented Oct. 25, 1938

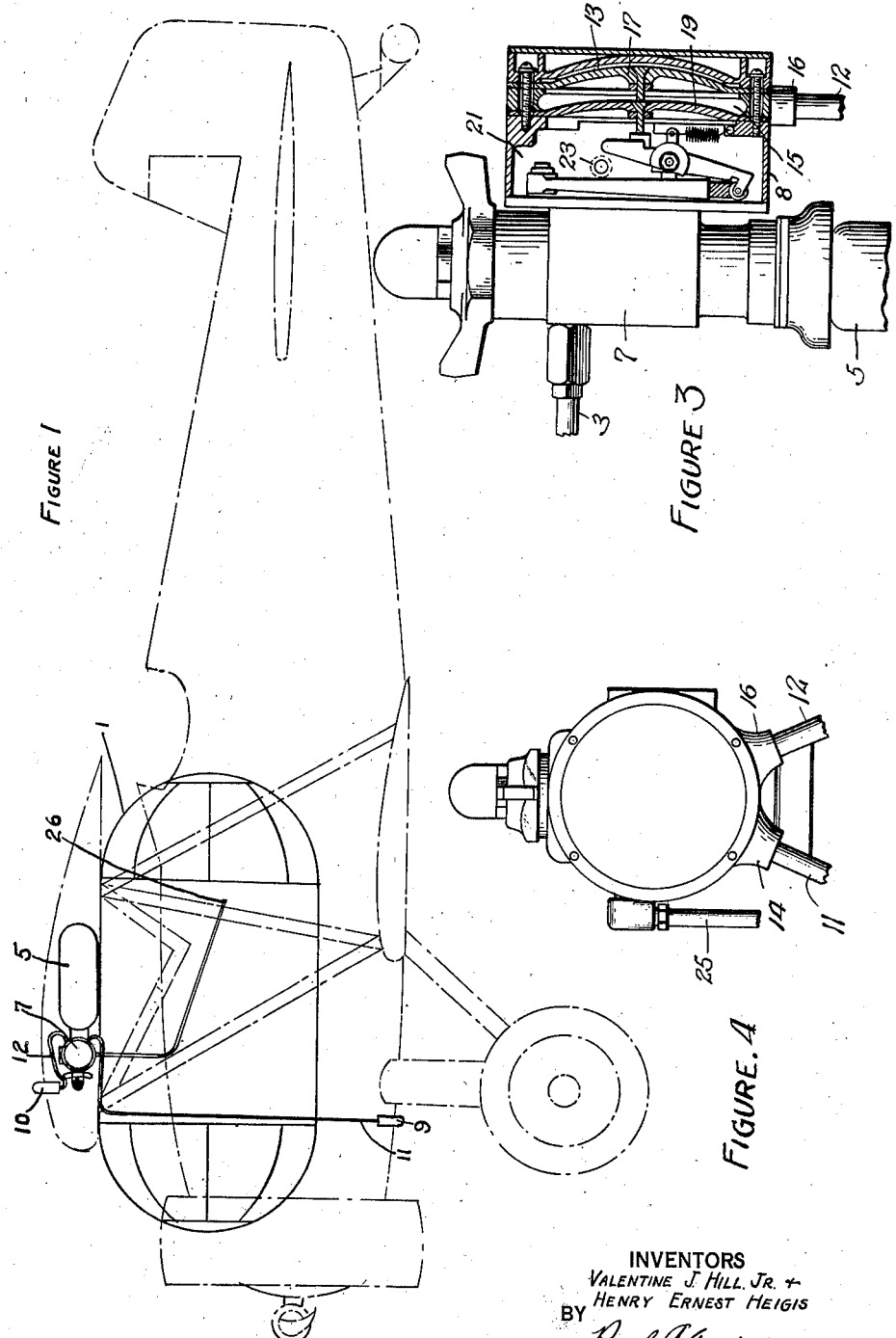

2,134,653

UNITED STATES PATENT OFFICE 2,134,653

AIRPLANE FLOTATION DEVICE

Valentine J. Hill, Jr., Bloomfield, and Henry Ernest Heigis, West Orange, N. J., assignors to Walter Kidde & Company, Inc., Bloomfield, N. J., a corporation of New York Application June 4, 1935, Serial No. 24,804

4 Claims. (Cl. 244—107)

The present invention relates to automatic flotation equipment for aircraft and embodies more specifically an improved mechanism to insure inflation of the buoyant devices whenever the aircraft alights in water regardless of the position in which the aircraft happens to strike the water.

In another application for Letters Patent of the United States, Serial No. 515,717, filed February 14, 1931, there is disclosed flotation equipment for aircraft of the type which embodies flotation bags mounted on the airplane and adapted to be filled with a buoyant fluid when the airplane descends upon a body of water. The inflated bags will then enable the plane to float on the water until it can be rescued. The buoyant fluid stored in a container, placed on the airplane, is released from the container by a valve, normally restraining the fluid in the container, and is led directly to the flotation bags. The valve releasing the fluid may be operated either by a manual means or by means of actuators which when they strike the water set up an air pressure impulse which trips the valve. In order that the flotation system will function automatically when the plane hits the water, whether the airplane alights in an upright or inverted position, several actuators are provided.

Despite this precaution one serious difficulty has arisen with such a system in that the valve would not trip automatically under certain conditions when the airplane struck the water which made the equipment valueless with a consequent loss of life and property. One of the conditions under which the valve would not release the inflating fluid occurred when the airplane landed in the water in such a position that the valve was submerged in the water before any of the actuators had struck the water.

It has been determined that if a valve which is not water tight is immersed in water before the actuating means water will leak into the valve and prevent its operation. If on the other hand the valve was made water tight, the back pressure built up in the valve by the air would be so great as to prevent operation of the valve by a slight air pressure impulse, such as a static head of six inches of water set up by an actuating means.

Hence, in the embodiment of the invention which is illustrated in the present application, the valve is provided with means which permit the valve to be tripped even though it should be submerged before the actuator itself is submerged.

Accordingly it is an object of the invention to permit the escape of air from the valve under all conditions when it is desired to actuate the valve.

A further object is to provide a water tight valve with a vent to insure operation at all times.

It is a further object to provide the valve with a vent which will practically never become submerged in water before one of the actuators has tripped the valve.

A still further object is to provide a valve vent terminating at a point which would practically never become submerged before one of the actuators.

The foregoing objects and others ancillary thereto we prefer to accomplish as follows:

According to the preferred embodiment of our invention, we equip the lever chamber of a valve, such as is shown and described in the application for United States patent, Serial No. 515,717, filed on February 14, 1931, with a vent. The vent is led from the valve to a point which rarely becomes submerged before an actuator has been immersed.

The features which are novel in this invention are set forth with particularity in the appended claims. However, the invention itself will best be understood as to its organization and method of operation, as well as additional objects and advantages, from the following description of a specific embodiment of the invention and by consideration of the accompanying drawings wherein:

Figure 1 is a view in side elevation showing flotation equipment constructed in accordance with the present invention and applied to an airplane which is indicated in dot and dash lines.

Figure 2 is a front view showing the equipment of Figure 1 and likewise the airplane upon which it has been installed, the airplane being shown in dot and dash lines.

Figure 3 is an elevational view of the releasing valve with the lever chamber in section to show the outlet for the vent at one side of the chamber.

Figure 4 is a side elevational view of the lever chamber showing the vent line connected thereto.

Figure 5 is a detail view in section, showing an actuator adapted to be used in connection with the present invention.

The entire airplane flotation system has been illustrated for convenience in understanding and it will now be generally described, but for particular details reference is made to the aforementioned application for Letters Patent.

By reference to Figures 1, 2, it will be seen that a flotation system for an airplane consists of flotation bags 1 which are shown inflated in the figure and which are usually mounted on the wings of the airplane. Each bag 1 has connected thereto a pipe line 3 which leads the buoyant fluid from the container 5. The container 5 is usually mounted in a central position with respect to the bags. The buoyant fluid, such as carbon dioxide, is stored in the container 5 and will escape therefrom under its own pressure when the releasing valve 7 is actuated.

It is customary to have two means of operating the valve 7. A manual means which may be controlled by the pilot or any other person in the plane is usually provided, and in order to make the tripping of the valve automatic when the airplane alights on water the actuators 9 and 10 are connected to the releasing means by actuator pipe lines 11 and 12.

The actuators 9 and 10 are so designed that, upon being immersed in water, the water will serve to compress the air in the actuator. The pressure built up will be transmitted back through the pipe lines 11 and 12 to the releasing device, thus providing an impulse to trip the levers which operate the valve 7.

The specific form of actuator which has been found to be highly effective in systems of this character is illustrated in Figure 5. The actuators are connected to the respective pressure chambers by actuator pipe lines 11 and 12. The difficulty heretofore encountered in transmitting the actuating pressure to the actuating diaphragm by simply dipping the small bore tubing into water has been overcome by the present construction. Due to the small bore of the actuator pipe line there is a tendency to retard the entry of the water into the actuator pipe line with the result that the pipe line would have to be immersed to a much greater depth than is desired before actuation of the valve would be accomplished. In this connection, it will be understood that the actuating fluid does not itself normally reach the valve but in the case of a liquid actuating fluid, the pressure is transmitted to the valve by compression of the air normally contained therein and in the actuator pipe lines leading to the valve.

To overcome the resistance to the flow of the liquid in the small bore actuator pipe line, an actuator barrel 13a has been provided which is of considerably larger diameter than the small bore actuator lines. The actuator barrel is connected to the actuator lines by a coupling member 14a and is substantially closed at the other end by means of a cap 15a. Perforations 17a are formed in the barrel 13a adjacent the end to which the cap 15a is secured. It is preferred that the perforations do not extend to the fitting 14a in order that a chamber may be provided adjacent this end of the actuator in which a pressure may be produced by the head of the liquid in which the actuator is immersed. The reason for capping the lower end of the barrel is to prevent actuation of the valve due to a pressure wave caused by the barrel being placed in a rapidly moving air stream such, for example, as would be encountered if the barrel were pointed toward the nose of an airplane, etc. The cap 15a is provided with radial openings 16a for draining any water which collects within the barrel and, inasmuch as these openings are radial, the wind pressure externally of the barrel will not be transmitted to the interior thereof. The perforations 17a are so formed as to prevent the transmission of pressure waves to the actuating mechanism due to wind pressure externally of the barrel. To this effect the axes of the perforations preferably lie perpendicular to the axis of the barrel.

From the foregoing description it will be apparent that a releasing mechanism has been provided for systems of the above character wherein automatic operation is effected when the plane alights on water, the apparatus not being susceptible of premature operation or delayed operation by an excited pilot or passenger. The manual releasing feature is, however, provided for use in the event of an emergency.

With reference to Figure 3 it may be noted that the air pressure set up by actuator 9 is transmitted to the compartment 13 in the lever chamber 8. The actuator pipe line 11 leading from the actuator is connected to the compartment 13 at the connection 14 which is shown externally in Figure 4. In the same manner the actuator 10 is connected by actuator pipe line 12 to the compartment 15 through the connection 16. It will thus be seen that each actuator is connected to a separate compartment. The compartment 13 has as one wall thereof a diaphragm 17 while one wall of the compartment 15 is the diaphragm 19.

The lever compartment proper 21 comprises another compartment which has as one wall thereof the flexible diaphragm 19. In the past the compartment 21 has been neither air tight nor water tight, so that when the diaphragm 19 was subjected to an impulse from the actuator 10, or to the force set up by the movement of diaphragm 17 due to an air pressure impulse from the actuator 9, at a time when the valve was not immersed in water, the air in the compartment 21 would not be compressed and would not build up a back pressure to prevent the full operative movement of the diaphragm 19, because it would be allowed to escape. However, when the valve became immersed before an actuator, which quite often happens in actual practice, the air in the compartment 21 would be sealed against escape by the water and the back pressure built up by the trapped air and water would oppose the full operative movement of the diaphragm, thereby preventing operation of the valve.

In accordance with the present invention the entire lever chamber 8 is first of all made water tight, in order to prevent any water from getting into the compartment 21, if it should happen that the valve 7 is submerged in water before either of the actuators 9 and 10. At the same time, in order to prevent the building up of back pressure by the air which would now be trapped in the water tight compartment, a vent aperture 23, from which is led a vent line 25, is provided to permit the escape of air from the compartment 21. The external connection of this aperture to the vent line 25 is best shown in Figure 4.

It is apparent that the vent line must terminate at some point which will never be submerged in water before one of the two actuators has created an air pressure impulse resulting in operation of the releasing valve 7 and hence inflation of the flotation bags 1.

It has been found in the past that the portion of an airplane which will, under almost every condition, strike the water first is the portion wherein the motor is mounted since that is the heaviest part of the airplane. The motor is placed in the nose of the airplane and consequently that portion will land first. For this reason it can be seen that the vent should be located at a point behind both the motor and the nose of the aircraft.

A suitable position to terminate the vent may be located at a point 20 which is shown in Figure 1. This point is located midway between the actuators 9 and 10 on a vertical plane through the axes of the actuators and the airplane and to the rear of the rearmost actuator and is at or near the central horizontal axis of the aircraft. Practically, a good position for the vent to be placed is at a point between the actuators so that it will be at least two feet above the actuator which strikes the water first, regardless of which actuator it is, and two feet behind the rearmost actuator.

From the foregoing description it will be seen that a vent for a sealed airplane flotation system valve has been provided which will insure operation of the valve under all conditions. Although the invention has been described with particular reference to the embodiment of the invention which is illustrated, other embodiments will be apparent to those skilled in the art. The invention therefore is not to be restricted save as defined in the appended claims.

What we claim is:

1. In combination with an airplane structure, an airplane flotation equipment including a valve, a closed air chamber in said valve, fluid operated means in said chamber forming a wall thereof and adapted to actuate said valve, and a vent for said chamber, said vent terminating at a point near the central horizontal axis of the airplane structure.

2. In combination with an airplane structure, an airplane flotation equipment including a valve, a sealed air chamber in said valve, a diaphragm in said chamber forming a wall thereof and adapted to actuate said valve, a second air chamber in said valve, said diaphragm also forming a wall of said second chamber, an actuator for said valve adapted to set up an air pressure impulse upon immersion in water, an actuator line establishing communication between said actuator and said second chamber to transmit pressure impulses thereto, an aperture in a wall of said first chamber, and a vent line in communication with said aperture, said vent line terminating at a point near the central horizontal axis of the airplane structure.

3. In combination with an airplane structure, an airplane flotation equipment including a valve, a sealed air chamber in said valve, at least one diaphragm in said chamber forming a wall thereof and adapted to actuate said diaphragm, a pair of actuators adapted to set up an air pressure impulse upon immersion in water, one of said actuators being located in the super-structure of the airplane and the other in the sub-structure thereof, tubes to establish communication between said actuators and said chamber, an aperture in said chamber on the opposite side of said diaphragm from the points of connection of said tubes, and a vent line in communication with said aperture, said vent line terminating at a point between the actuators and behind them with respect to the nose of the airplane structure.

4. In combination with an airplane structure, an airplane flotation equipment including a valve, a chamber sealed against the entrance of external media in said valve, a plurality of movable diaphragms adapted to actuate said valve and dividing said chamber into a plurality of separate sealed compartments, a plurality of actuators each adapted to create a pressure impulse to move a diaphragm, one of said actuators being located in the super-structure of the airplane and another in the sub-structure thereof, at least one of said compartments being adapted to contract, and a vent in communication with said contracting compartment, said vent terminating at a point between the uppermost and lowermost actuators and behind said actuators with respect to the nose of the airplane structure.

VALENTINE J. HILL, Jr.
HENRY ERNEST HEIGIS.